Patented June 6, 1939

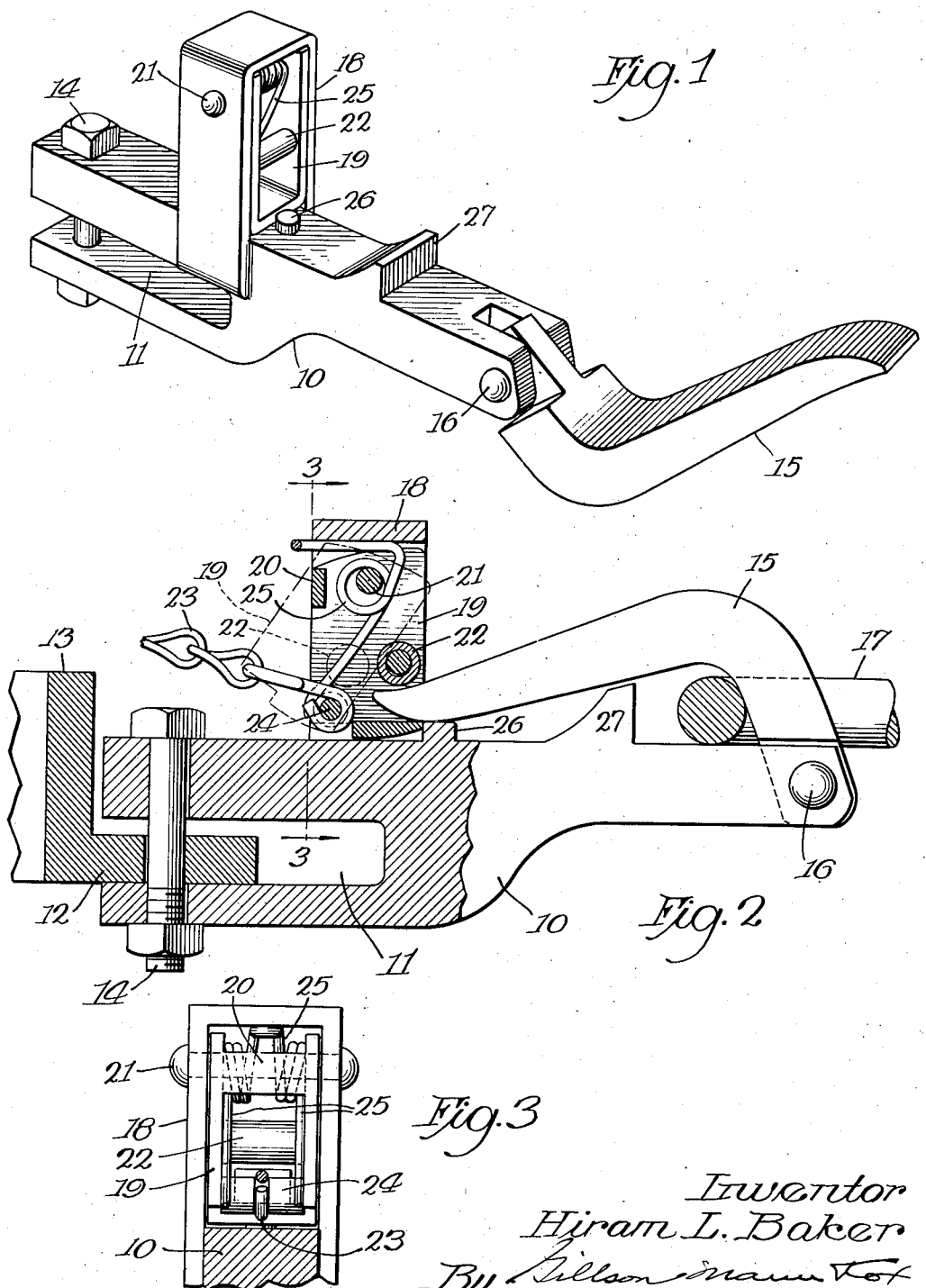

2,160,815

UNITED STATES PATENT OFFICE 2,160,815

TRAILER COUPLING

Hiram L. Baker, Leland, Ill.

Application November 26, 1937, Serial No. 176,574

4 Claims. (Cl. 280—33.15)

The invention relates to a coupling device for securing a trailer vehicle to a draft vehicle; and its object is to provide a coupling of strong, rugged and simple construction, which may be readily applied and may be released from the seat of the operator of the draft vehicle.

The preferred form of embodiment of the invention is hereinafter described and is illustrated in the accompanying drawing, in which Fig. 1 is a perspective view of the coupling in disengaged position;

Fig. 2 is a longitudinal side view, partly in section and including portions of the two vehicles; and Fig. 3 is a detail sectional view on the line 3—3 of Fig. 2.

The coupling is especially intended for use in connection with agricultural implements, such as plows, cultivators, wagons, etc., which are drawn by a tractor or other draft vehicle. It is frequently necessary to detach a drawn vehicle in farming operations, as, for example, the receiving wagon attending a corn picker; and it is desirable, in order to save time, that the coupler should be controllable by the driver of the traction vehicle as he occupies his seat. The coupling should be simple of construction, strong and reliable, and easily connected and disconnected, and the device forming the subject of this specification possesses all of these characteristics, and others.

The device comprises a shackle bar 10, having at its forward end a longitudinally entering transverse slot 11, for receiving the draft lug 12 of a vehicle, the rear end of which is indicated at 13. This bifurcated forward end of the shackle is vertically apertured to receive a bolt 14, for securing it to the lug 12.

A bowed hasp 15 is pivotally secured to the rear end of the shackle bar, as indicated at 16. This hasp is adapted to engage and secure a link 17 of a draft chain for the trailing vehicle.

A retaining latch is pivoted within a housing 18, in the form of an inverted U-shaped loop rising from the middle portion of the shackle bar and firmly secured thereto, as by welding. The latch element 19 is pivotally mounted within this housing, and may take the form of a U-shaped plate, as shown being strengthened by a cross-bar 20 near its upper end.

The element 19 is secured within the housing by means of a pivot pin 21, passing through the upper portions of the side members of each of these elements. The retaining bar of the latch element takes the form of a pin setting through its side walls, and upon which is loosely sleeved an antifriction roller 22 for engagement by the hasp. The latch element may be drawn forward by a pull cable, the rear end of which is shown at 23, secured to a cross-pin 24 at the lower end of the element, and being of any desirable length and, therefore, capable of being prolonged to the seat of the traction vehicle. A spring 25, coiled about the pivot pin 21, has one end in engagement with the pin 24 and the other end with the cross-member of the housing 18, and urges the latching element into engagement with a stop lug 26, formed upon the upper face of the shackle immediately back of the housing 18, and into position for engagement by the nose of the hasp.

The parts are so proportioned that the nose of the hasp enters within the rear end of the housing, and when in engaged position projects under and is securely held by the anti-friction roller 22. The nose of the hasp is beveled, as shown, sufficiently to cause it to cam back the latch element in closing. A stop lug 27 is preferably formed on the upper face of the shackle bar back of the housing 18, and limits the longitudinal movement of the link 17 when engaged by the shackle.

In connecting the two vehicles the hasp is thrown backwardly to the position shown in Fig. 1, the link 17 is looped over it, and the hasp is then thrown forwardly and automatically engages under the sleeve 22. The disengagement of the trailing vehicle is accomplished by the operator occupying his seat on the draft vehicle, by merely pulling the cable 23 to swing the securing latch to its dotted lines position. As the draft vehicle moves forward the shackle is thrown back to open position and the link 17 is free to slide therefrom.

The device is simple of construction, easy of operation, and of ample strength when in the form shown. The invention, however, may be differently embodied within the scope of the appended claims.

I claim as my invention—

1. In a trailer hitch, in combination, a draw-bar for attachment to a draft vehicle, a hasp pivotally attached to the rear end of the draw-bar and foldable thereover, and having a receding cam face at its outer end, a fixed frame carried by and arching over the draw bar, a swinging frame mounted within the fixed frame and carrying a cross-bar engageable by the cam face of the hasp, and spring means for advancing the cross-bar over the end of the hasp after such engagement.

2. In a vehicle coupling device, in combination, a shackle bar attachable to a draft vehicle, a hasp pivotally attached to the rear end of the bar and foldable thereover for engagement by the trailer, a fixed frame arching over the bar, a spring advanced locking latch mounted within the frame and engageable over the nose of the hasp, such nose being adapted to displace the latch by a cam action as it enters the frame, and a pull line for manually disengaging the latch from the hasp.

3. In a vehicle coupling device, in combination, a shackle bar attachable to a draft vehicle, a hasp pivotally attached to the rear end of the bar and foldable thereover for engagement by the trailer, a fixed frame arching over the bar, a spring advanced U-shaped plate pivotally mounted within the frame, a latch bar within the U-shaped plate and engageable over the nose of the hasp, such nose being adapted to displace the latch by a cam action as it enters the frame and a pull line for manually disengaging the latch from the hasp.

4. In a trailer hitch, in combination, a draw bar adapted at one end for attachment to a vehicle, a bowed hasp attached to the opposite end and foldable over the body of the bar and having a beveled end, a frame comprising side members attached rigidly to the bar and projecting upwardly and positioned to receive between them the end of the hasp, a spring advanced stirrup suspended within the frame and adapted to receive the outer end of the hasp, and a latch bar within the stirrup and positioned for engagement by the beveled face of the hasp as the latter enters between the frame members and to swing over the end of the hasp after the latter passes beyond it.

HIRAM L. BAKER.